United States Patent [19]

Tomaswick et al.

[11] Patent Number: 4,809,876

[45] Date of Patent: Mar. 7, 1989

[54] CONTAINER BODY HAVING IMPROVED GAS BARRIER PROPERTIES

[75] Inventors: Kathleen M. Tomaswick, Kittanning; Alfred F. LaCamera, Penn Township, Allegheny County, both of Pa.

[73] Assignee: Aluminum Company of America, Pittsburgh, Pa.

[21] Appl. No.: 90,124

[22] Filed: Aug. 27, 1987

[51] Int. Cl.$^4$ ............................................. B65D 5/00
[52] U.S. Cl. ............................ 220/458; 428/35.8; 428/484; 428/408; 428/36.6
[58] Field of Search ............... 220/458; 428/35, 36, 428/484, 408; 264/39

[56] References Cited

U.S. PATENT DOCUMENTS

| | | | |
|---|---|---|---|
| 3,219,729 | 11/1965 | Meyers et al. | 220/458 |
| 3,268,620 | 8/1966 | Tarnid | 220/458 |
| 3,496,258 | 2/1970 | Wiley | 264/39 |
| 3,733,309 | 5/1973 | Wyeth et al. | 260/75 T |
| 4,447,199 | 5/1984 | Reed et al. | 425/182 |
| 4,504,519 | 3/1985 | Zelez | 427/39 |
| 4,547,416 | 10/1985 | Reed et al. | 428/36 |
| 4,595,611 | 6/1986 | Quick et al. | 220/458 |

FOREIGN PATENT DOCUMENTS 1150469  7/1983  Canada.
2145027  3/1985  United Kingdom.

OTHER PUBLICATIONS

S. Aisenberg et al, "Novel Materials for Improved Optical Disk Lifetime", SPIE, vol. 299, Advances in Laser Scanning Technology (1981), pp. 64–67.

*Primary Examiner*—Joseph Man-Fu Moy
*Attorney, Agent, or Firm*—Glenn E. Klepac

[57] ABSTRACT

A container body for foods and beverages having reduced gas and vapor permeability. The container body is preferably formed from a plastic resin and coated with a thin film of diamond-like carbon.

20 Claims, 1 Drawing Sheet

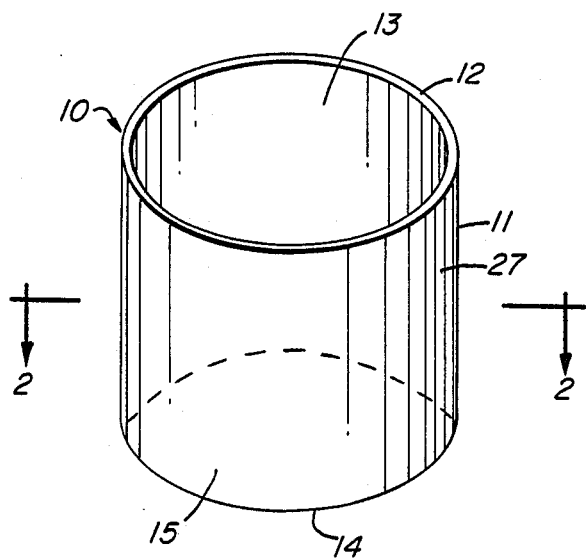
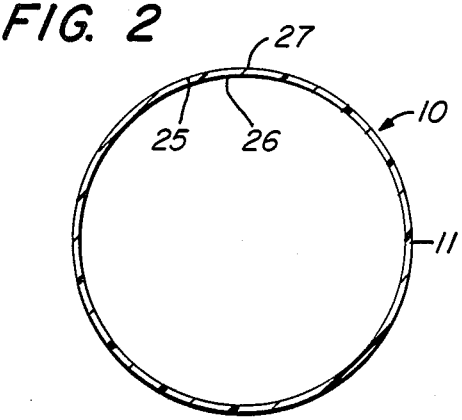
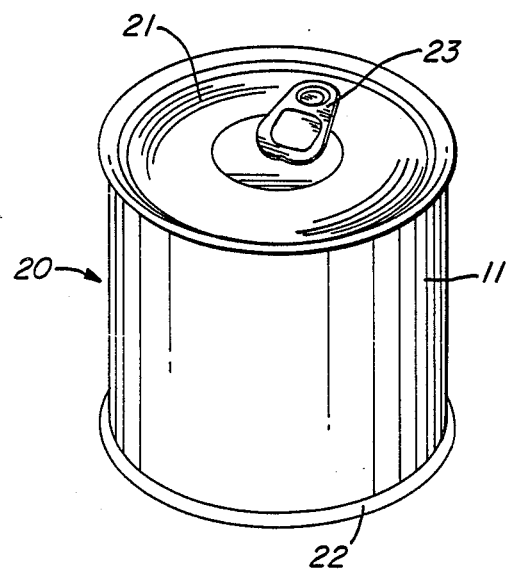

CONTAINER BODY HAVING IMPROVED GAS BARRIER PROPERTIES

FIELD OF THE INVENTION

The present invention relates to food and beverage containers and more particularly to a container body coated with a film which reduces permeability to gases, vapors, and flavors.

BACKGROUND OF THE INVENTION

In the manufacture of canned foodstuffs such as meats, vegetables, and beverages, plastic, and wax-coated materials have heretofore achieved only limited use because they are excessively permeable to gases. Attempts to use olefinic resins such as polyethylene and polypropylene have encountered the disadvantage that such resins are excessively permeable to oxygen. The permeation of oxygen into food containers causes undesirable discoloration and depreciation in taste and other sensory qualities of the foodstuff. The poor gas permeability characteristics of polyethylene and polypropylene have resulted in containers fabricated from those resins being rejected in the packaging of oxygen sensitive comestibles.

The manufacture of beverage containers from biaxially oriented polyethylene terephthalate is known in the prior art. As used herein, the terms "polyethylene terephthalate" and "PET" include not only the homopolymer formed by polycondensation of beta-hydroxyethyl terephthalate but also copolyesters containing minor proportions of units that are derived from other glycols and other diacids, such as isophthalic acid.

Biaxially oriented PET containers are strong and have good creep resistance. Containers of relatively thin wall and light weight can be produced from PET. These containers are capable of withstanding, without substantial mechanical deformation over their shelf lives, the pressure generated by carbonated beverages such as soft drinks, beer, and sparkling wines.

Thin-walled PET containers are somewhat permeable to carbon dioxide and oxygen. As a result, PET containers lose their pressurizing carbon dioxide over time and allow transport of oxygen which affects flavor and appearance of the contents. This permeability is more important for small containers having high surface-to-volume ratios than for large containers.

In the prior art, numerous techniques have been devised for reducing the gas and vapor permeability of containers fabricated from PET and other resins. Such techniques include addition of inorganic fillers such as mica, talc, and alumina to the resins; coating the containers with resins having barrier properties; and blending, laminating, or co-extruding the resins with barrier resins. Some barrier resins employed in the prior art for coating, blending, laminating and/or co-extrusion include vinylidene chloride polymers and copolymers such as polyvinylidene chloride, vinylidene chloride/vinyl chloride copolymers, and vinylidene chloride/acrylonitrile copolymers; polyvinyl alcohol and vinyl alcohol copolymers with ethylene; nylon; acrylonitrile/alkyl acrylate copolymers and acrylonitrile/styrene copolymers.

Two resins used for coating various plastic substrates to reduce their gas permeability are vinylidene chloride polymers and polyvinyl alcohol. A latex of polyvinylidene chloride can be applied at the preform stage. However, at this stage the coating must be thick because both coating thickness and body wall thickness are reduced during the subsequent blow molding operation. In practice, the use of polyvinylidene chloride as a coating generally involves application of a plurality of layers with intermediate drying after each layer. The latex can also be applied onto the finished container.

Polyvinyl alcohol is a gas and flavor barrier material having better diffusion resistance than polyvinylidene chloride. However, polyvinyl alcohol is adversely affected by moisture. Among the effects of moisture on polyvinyl alcohol are reduced gas tightness, change in appearance and generally reduced mechanical properties. Accordingly, it is desirable to protect the polyvinyl alcohol layer with a coating of a water-resistant polymer. Moisture sensitivity of this polymer is also reduced by forming a copolymer of vinyl alcohol with ethylene.

The techniques referred to above all generally reduce the permeability of PET and other plastic resins to gases, vapors, and flavors. However, the prior techniques for enhancing barrier properties each suffer from one or more serious disadvantages making them less than entirely suitable for their intended purpose. Such disadvantages include difficulties in handling and co-extruding the barrier resins; increased container bulk and weight; unsatisfactory gas or vapor barrier properties; and high cost.

A principal objective of the present invention is to overcome the above-listed shortcomings of prior art containers by providing a container body coated with a carbon film imparting reduced gas permeability to the body.

A related objective of the invention is to provide a process for producing the film-coated container body.

Additional objects and advantages will become apparent to persons skilled in the art from the following specification and claims.

SUMMARY OF THE INVENTION

In accordance with the present invention, there is provided a container body for food and beverage products comprising a hollow body having an open end. The body is preferably a generally cylindrical hollow can body having two open ends. However, various other container body shapes are within the scope of the invention. Such other shapes include bottles, trays, and dish-shaped container bodies. All of such shapes are generally provided with an end closure sealing off at least one end.

The body is formed from a plastic resin or a wax-coated paper, cardboard or plastic substrate. The body preferably comprises a thermoplastic resin although thermoset resins are also contemplated.

Some suitable thermoplastic resins are polypropylene, polyethylene, polypropylene/polyethylene copolymers, polyvinyl chloride, polycarbonates, polyesters, and mixtures thereof. The body is preferably polyethylene terephthalate.

A preferred cylindrical body is biaxially oriented by a process which includes the steps of making a preform of thermoplastic material and drawing and blowing the preform under biaxial orientation conditions to produce a hollow body. The step of blowing may be performed within the confines of a mold or under free-blowing conditions. The body is manufactured into a food or beverage container by sealing off one or both ends with plastic or metal end closures.

In order to reduce gas and vapor permeability, at least a portion of the container body is coated with a film comprising diamond-like carbon or diamond carbon. The preferred film is diamond-like carbon having a thickness of about 5–2000 angstroms, preferably at least about 10 angstroms and more preferably about 20–1500 angstroms. A coating having a thickness of approximately 1000 angstroms is used in a particularly preferred embodiment.

The diamond-like carbon film may be applied either to an interior surface portion or to an exterior surface portion of the body. Application to the entire exterior surface portion is generally preferred.

Alternatively, the film of the invention may first be coated onto a generally planar wax-coated sheet or plastic sheet. The film-coated sheet is then formed into a desired container body shape.

BRIEF DESCRIPTION OF THE DRAWINGS

FIG. 1 is a perspective view of a preferred container body made in accordance with the present invention.

FIG. 2 is a cross-sectional view taken along the lines 2—2 of FIG. 1.

FIG. 3 is a perspective view of a preferred container body made in accordance with the invention.

DETAILED DESCRIPTION OF A PREFERRED EMBODIMENT

A particularly preferred biaxially oriented container body is made from polyethylene terephthalate. The body is manufactured by a process which includes the steps of making a preform and drawing and blowing the preform under biaxial orientation conditions to produce a hollow cylindrical body having two open ends. The blowing step may be performed either within the confines of a mold or under free blowing conditions. A particularly preferred process is described in Reed et al U.S. Pat. Nos. 4,447,199 and 4,547,416. The disclosures of said Reed et al patents are incorporated herein by reference, to the extent consistent with the present invention.

Other suitable processes for making PET containers are described in Wyeth et al U.S. Pat. No. 3,733,309 and Taylor Canadian Pat. No. 1,150,469. A suitable process for making containers from polypropylene or polyethylene is described in Wiley U.S. Pat. No. 3,496,258. These three patents all describe a blowing step performed within the confines of a mold. PET containers may also be formed by blowing without a mold, as described in British Patent Publication No. 2,145,027. The disclosures of all four above-cited publications are incorporated herein by reference, to the extent consistent with the present invention.

As shown in FIGS. 1 and 2, a particularly preferred PET container body 10 comprises a generally cylindrical tubular side wall 11 having a first lip 12 defining a first open end 13 and a second lip 14 defining a second open end 15.

There is shown in FIG. 3 a preferred food or beverage container 20 manufactured from the container body of the invention. The container 20 comprises a generally cylindrical can having a top or first end closed by a first metal end closure 21 and a bottom or second end closed by a second metal end closure 22. The closures 21, 22 may be glued, heat-bonded and/or crimped into place. The first end closure 21 is preferably an aluminum easy-open end closure having a pull tab 23.

Referring now to FIG. 2, the container body 10 comprises an outwardly facing exterior surface portion 25 and an inwardly facing interior surface portion 26. The outer surface portion 25 is coated with a thin film 27 of diamond-like carbon. The preferred film illustrated has a thickness of approximately 1000 angstroms.

As used herein, the term "diamond-like carbon" refers to carbon having a major proportion of $sp^3$ tetrahedral bonding and a minor proportion of $sp^2$ bonds. Diamond-like carbon films are amorphous (i.e., their structure is characterized by long range chemical disorder). Diamond-like carbon also contains hydrogen, which is probably both chemically bonded to and physically trapped by the carbon. The hydrogen content can vary widely, but is generally less than about 50 atom%. A particularly preferred diamond-like film comprises approximately 20–40 atom% hydrogen.

The improved container body described and claimed herein has excellent optical properties and is practically impervious to oxygen, carbon dioxide, water vapor, and food and beverage flavors. The diamond-like carbon film can be made optically clear or with a slight yellow, brown, or gray tint. The film is abrasion resistant, is not chemically attacked by acids or bases, and has a low coefficient of friction. The film adheres tightly to plastic substrates. Film density is about 1.7–1.8 g/cm$^3$. The film is inexpensive to produce, long-lasting, and does not adversely affect food or beverage taste. Non-metallic food and beverage container bodies covered by the diamond-like film of the invention are microwaveable.

The diamond-like film may be formed by radio frequency discharge, direct or dual ion beam deposition, or sputtering. Radio frequency flow discharge in methane is particularly preferred. Methane may be replaced by propane, butane, and other aliphatic and aromatic hydrocarbons not containing oxygen or nitrogen. Gaseous fluorocarbons and hydrofluorocarbons are also suitable.

A particularly preferred diamond-like carbon film has been applied to a partially nucleated PET substrate having 10 cm (4 in.) diameter and 1.0 mm (0.040 in.) thickness. The substrate was inserted into an RF chamber wherein pressure was reduced to $10^{-7}$ torr prior to coating. Argon was introduced, bringing total pressure up to 25 millitorr, and the substrate surface was cleaned at a frequency of 13.56 MHz and 1.5 kv bias voltage. Finally, methane was flowed into the chamber at 24 millitorr and a diamond-like carbon film was produced with 0.5 kv bias voltage. The electrode was water-cooled. A film thickness of 1000 angstroms was deposited in seven minutes.

The term "diamond carbon" as used herein refers to polycrystalline carbon having $sp^3$ tetrahedral bonding. Diamond-like carbon films are believed to have better gas and vapor barrier properties than diamond carbon films of equal thickness.

Persons skilled in the art will understand that numerous changes and modifications can be made in the preferred container and process described above without departing the spirit and scope of the following claims. For example, although the preferred container described above is made from biaxially oriented PET, the container body may also be manufactured from unoriented or uniaxially oriented plastic resins.

What is claimed is:

1. A container body for food and beverage products comprising a hollow body having an open end, said body comprising a plastic resin or a wax having at least a portion coated with a film which imparts reduced gas and vapor permeability, said film comprising diamond-like carbon or diamond carbon.

2. The container body of claim 1 wherein said body is formed from a resin comprising a polyolefin, polyvinyl chloride, a polycarbonate, or a polyester.

3. The container body of claim 2 wherein said resin is selected from the group consisting of polypropylene, polyethylene, polypropylene/polyethylene copolymers, polyvinyl chloride, polyethylene terephthalate, and mixtures thereof.

4. The container body of claim 1 wherein said body is formed from biaxially oriented polyethylene terephthalate.

5. The container body of claim 1 wherein said film comprises diamond-like carbon.

6. The container body of claim 5 wherein said film has a thickness of at least about 10 angstroms.

7. The container body of claim 5 wherein said film has a thickness of about 5–2000 angstroms.

8. The container body of claim 5 wherein said film has a thickness of about 20–1500 angstroms.

9. The container body of claim 1 wherein said film overlies an outwardly facing exterior surface portion of the body.

10. The container body of claim 1 wherein said film overlies an inwardly facing interior surface portion of the body.

11. A food or beverage container comprising the container body of claim 1 in the form of a generally cylindrical tube having at least one end closed by a plastic or metal end closure.

12. The container body of claim 1 comprising a bottle having a neck terminating in an open end.

13. A food or beverage container comprising the container body of claim 12 and a plastic or metal end closure overlying said open end.

14. In a process for producing a plastic food or beverage container which includes the steps of
    (a) making a preform;
    (b) forming the preform into a container body having an outwardly facing exterior surface portion and an inwardly facing interior surface portion;
the improvement comprising
    (c) coating the exterior surface portion or the interior surface portion with a film of diamond-like carbon or diamond carbon.

15. The process of claim 14 wherein step (c) is performed after step (b).

16. The process of claim 14 wherein step (b) comprises drawing and blowing the preform to produce a hollow body having at least one open end.

17. The process of claim 16 wherein step (b) is performed under biaxial orientation conditions.

18. The process of claim 14 wherein said container body consists essentially of a polyolefin, polyvinyl chloride, a polycarbonate, a polyester, or mixtures thereof.

19. The process of claim 14 wherein step (c) is performed by radio frequency glow discharge.

20. The process of claim 19 wherein step (c) is performed at reduced pressure in a chamber containing a hydrocarbon, fluorocarbon, or hydrofluorocarbon.

* * * * *